April 17, 1951 R. A. NEAL ET AL 2,548,904
JET ENGINE FUEL NOZZLE HOLDER AND MOUNTING
Filed Sept. 7, 1949 2 Sheets-Sheet 1
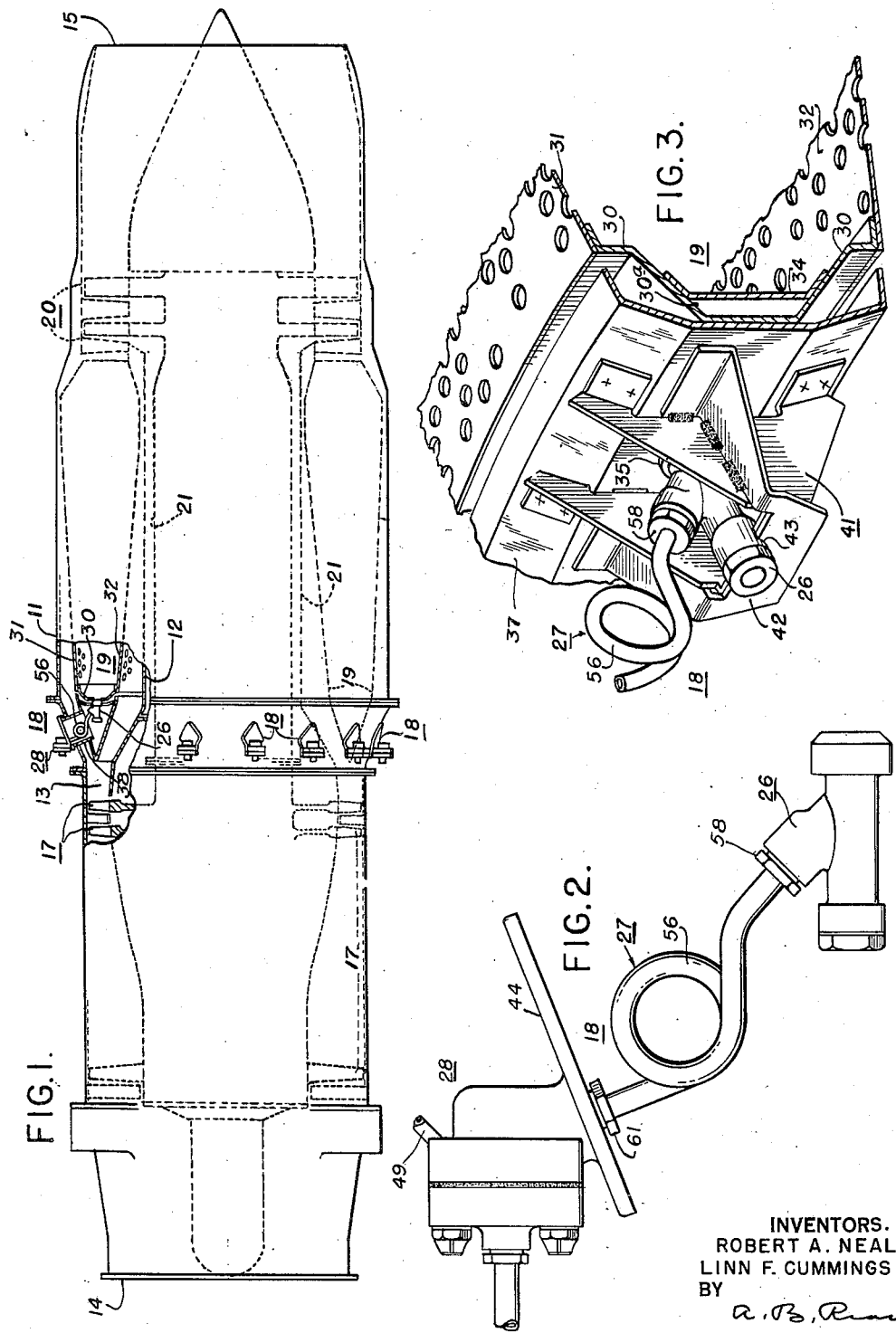
INVENTORS.
ROBERT A. NEAL
LINN F. CUMMINGS
BY
ATTORNEY

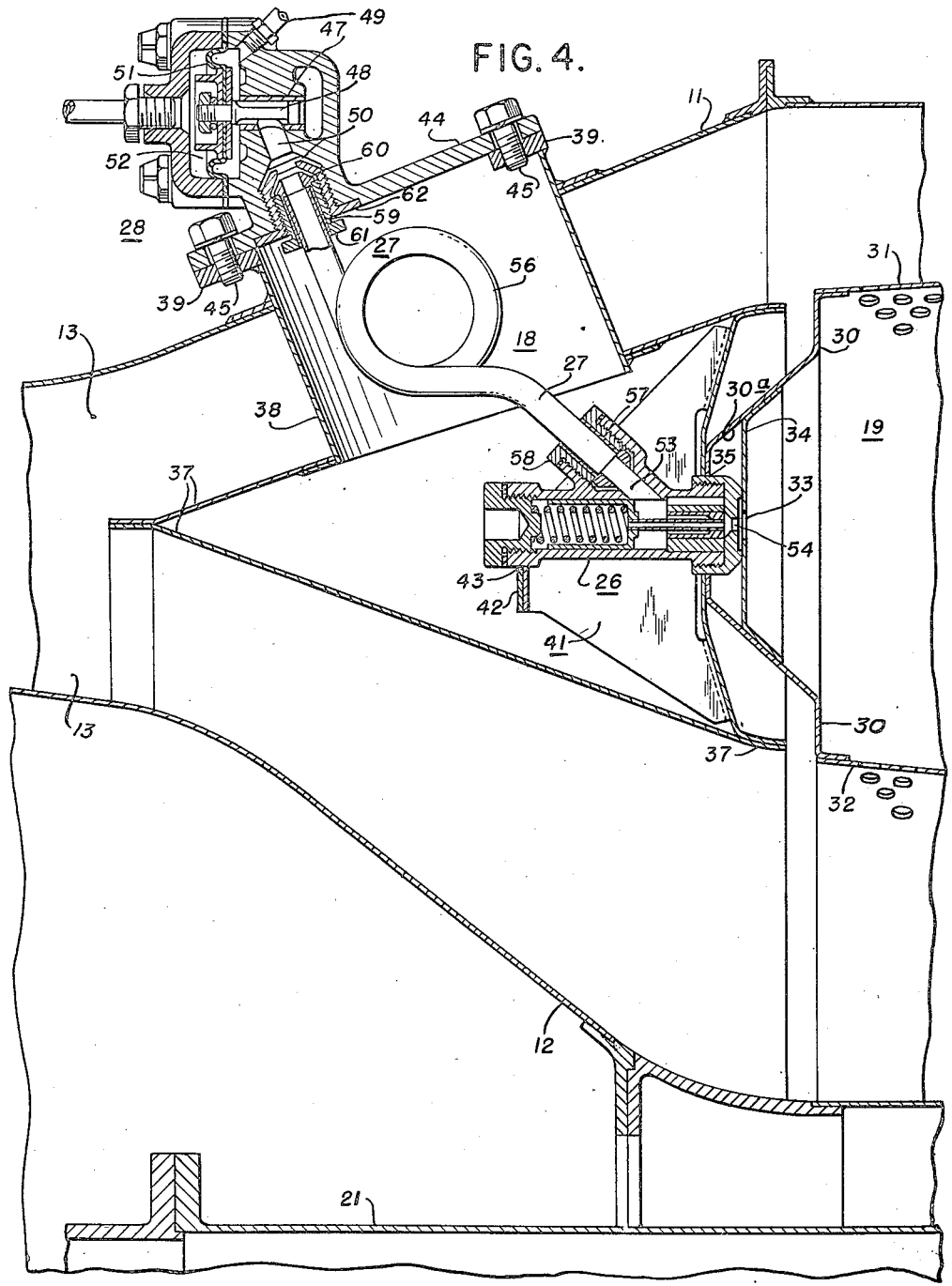

Patented Apr. 17, 1951

2,548,904

UNITED STATES PATENT OFFICE 2,548,904

JET ENGINE FUEL NOZZLE HOLDER AND MOUNTING

Robert A. Neal and Linn F. Cummings, Media, Pa., assignors to Westinghouse Electric Corporation, East Pittsburgh, Pa., a corporation of Pennsylvania Application September 7, 1949, Serial No. 114,411

3 Claims. (Cl. 60—44)

This invention relates to gas turbine power plants, particularly to fuel supply apparatus therefor, and has for an object the provision of improved fuel distribution equipment for association with an aircraft gas turbine engine.

In the copending application of L. F. Cummings and C. F. Wood filed June 10, 1949, Serial No. 98,334, there is disclosed fuel supply apparatus comprising a flow-divider valve device operative to distribute equal flow of fuel under pressure to a number of points, means for establishing a control pressure, and separate nozzles and individual regulating valves spaced about an annular combustor for metering the fuel at such points in accordance with the control pressure. It is a further object of the present invention to provide an improved construction and arrangement of parts for apparatus of the type described in that application.

Another object of the invention is the provision of means facilitating the mounting, in a gas turbine engine, of an individual fuel supply apparatus including a nozzle.

Features of the invention include the mounting of a fuel nozzle in combination with a flexible conduit constructed and arranged for supplying fuel to the nozzle inlet, and also serving as a biasing means for maintaining the nozzle in the desired position relative to the combustor regardless of minor differences in structural dimensions or variations due to thermal expansion of related parts.

These and other objects are effected by our invention as will be apparent from the following description and claims taken in connection with the accompanying drawings, forming a part of this application, in which:

Fig. 1 is a diagrammatic elevational view of a typical gas turbine power plant equipped with fuel supply apparatus constructed in accordance with the invention and shown partly in section;

Fig. 2 is an enlarged detail elevational view of one of the fuel supply assemblies shown in Fig. 1;

Fig. 3 is a fragmentary perspective view, in enlarged detail, showing one of the assemblies mounted on the upstream end of the combustion chamber structure of the engine shown in Fig. 1; and Fig. 4 is an enlarged detail sectional view of a similar portion of the same engine.

Referring now to Fig. 1 of the drawings, the typical gas turbine engine illustrated therein comprises an outer substantially cylindrical casing structure 11 having mounted therein a sectional core structure 12 forming an annular flow communication generally indicated at 13, which extends longitudinally through the engine from a frontal air intake duct 14 to a rearwardly disposed discharge nozzle 15. The operating elements of the engine are disposed in axial alignment within the casing structure and include an axial flow compressor 17, fuel supply assemblies 18, annular combustion apparatus 19, and a turbine 20, the rotor of which is connected to the rotor of the compressor through the medium of a shaft 21, which is journaled in suitable bearings (not shown) mounted in the core structure 12. The general principles of operation of such a power plant are well known, and may briefly be summarized as follows: air entering the intake duct 14 is compressed by the compressor 17, from which it is delivered to the combustion apparatus 19 for supporting combustion of fuel supplied thereto by way of the fuel supply assemblies 18, and the hot motive gases thus provided are then expanded through the turbine 20 and finally discharged to atmosphere by way of the nozzle 15, establishing a propulsive thrust.

The fuel supply assemblies 18 are circumferentially spaced upstream of the combustion apparatus 19, and each assembly comprises a variable-flow fuel nozzle 26, a spring conduit 27 and an equalizing valve device 28, as shown in Fig. 2. Referring to Fig. 4, the forward or upstream end of the combustion apparatus 19 includes an annular end wall 30, which joins the apertured cylindrical burner walls 31 and 32 and is provided with a fuel entryway 33 for each fuel supply assembly 18. The entryways 33 may be formed in an inner baffle 34 carried within a recessed portion 30a of the end wall 30, in which sockets or apertures 35 are formed for receiving the tips of the nozzles 26. A hollow annular fairing structure 37 is provided in the passage 13 for enclosing the nozzles 26, and is supported on a plurality of radially disposed hollow struts 38, the outer ends of which extend through suitable apertures in the casing 11 and carry outer bolting flanges 39. Each of the nozzles 26 is removably cradled in one of a pluraltiy of bracket structures 41 having suitable flanges welded to the rear wall of the fairing structure 37. As best shown in Fig. 3, the bracket structure includes a wall 42 having an arcuate recess or socket 43 for receiving the closed end of the nozzle 26, while the discharge end thereof is supported in the aperture 35.

Each equalizing valve device 28 may be of a suitable construction operative in the manner disclosed in the foregoing copending application, and as illustrated in Fig. 4 includes a casing having a bolting flange 44 adapted to be secured by bolts 45 to the flange 39. Mounted in a valve chamber 47 formed in the casing of the device 28 is a valve 48, which controls flow of fuel from an inlet 49 to an outlet 50 under control of a diaphragm 51 that is subject to the opposing pressures of fuel in the valve chamber and in a control pressure chamber 52. The outlet 50 communicates by way of the conduit 27 with an inlet 53 of the nozzle 26, from the outlet orifice 54 of which fuel is discharged through the entryway 33 into the combustion chamber of the apparatus 19. Further operational details of the fuel system are more fully described in the copending application already identified.

According to the present invention, each conduit 27 is formed of metal having pronounced spring characteristics, and is provided with a looped portion 56 intermediate the ends thereof, which portion is disposed within the associated hollow strut 38 and parallel to a radial plane relative to the engine. The inner end of the conduit 27 is secured to a headed sleeve element 57 which is received in the inlet 53 and held in place by means of a sleeve nut 58 having screw-threaded engagement in the casing of the nozzle 26. The outer end of the conduit 27 carries a sleeve element 59 having a head 60 which is engaged by a sleeve nut 61 mounted in adjustable relation within an outer sleeve nut 62, which is in turn secured in screw-threaded engagement in the outlet 50 of the valve device 28. The tension or spring effect of the flexible conduit 27 can thus be varied by suitable adjustment of the nut 61. Preferably, the initial length of the coiled conduit 27 and other elements of the assembly 18, as shown in Fig. 2, is such that upon application of the nozzle 26 to the cradle or bracket 41, a degree of flexing force will be required to overcome the spring bias of the conduit in order to effect engagement of the flanges 44 and 39.

From the foregoing, it will be apparent that each fuel supply assembly 18, comprising the nozzle 26, conduit 27 and equalizing valve device 28, may readily be installed as a unit in the power plant, by inserting the nozzle through the strut 38 and into cradled engagement with the bracket structure 41, whereupon the flange 44 may be brought into abutting relation with the flange 39 and bolted thereto, the yieldable coiled conduit 27 being at the same time placed under sufficient tension to maintain the nozzle firmly in place without necessitating the use of individual securing means therefor. This feature of the invention facilitates use of an economical and minimum weight construction involving relatively wide tolerances, whereby slight variations in assembly dimensions can be compensated by deflection of the coiled conduit.

While we have shown the invention in but one form, it will be obvious to those skilled in the art that it is not so limited, but is susceptible of various changes and modifications without departing from the spirit thereof.

What we claim is:

1. Combustion apparatus comprising a fuel nozzle, combustion chamber means having a socket for receiving said nozzle, a fuel metering valve device spaced from said chamber, and a flexible conduit interposed in strain relation between said valve device and said nozzle for urging the latter into engagement with the socket of said combustion chamber.

2. Combustion apparatus comprising a combustion chamber having an upstream entryway, a fuel nozzle having a tip engageable therewith, a fuel source including wall structure supported in spaced relation with respect to said combustion chamber, and a flexible conduit for maintaining communication between said fuel source and said nozzle, said conduit having a looped spring portion serving to apply a biasing force to said nozzle yieldingly resisting displacement thereof from said entryway.

3. Combustion apparatus for a gas turbine power plant comprising generally cylindrical casing structure having an annular air flow passage formed therein, annular combustion chamber means supported in said passage and having a plurality of fuel entryways formed in the upstream end thereof, annular fairing structure including nozzle brackets disposed adjacent and upstream of the respective fuel entryways in the combustion chamber, a plurality of radially arranged hollow struts aligned with said brackets for supporting said fairing structure from said casing structure, fuel supply means carried outwardly of said struts, a plurality of fuel nozzles removably disposed in engagement with said brackets and in registration with said fuel entryways, respectively, and an equal number of flexible conduits extending through said struts for supplying fuel from said supply means to each of said nozzles, each of said conduits having a spring loop portion disposed within the related strut for establishing biasing force urging the associated nozzle firmly in position relative to the bracket and combustion chamber means.

ROBERT A. NEAL.
LINN F. CUMMINGS.

No references cited.